Oct. 21, 1930. J. A. McCARTHY Re. 17,836

SHINGLE

Original Filed Nov. 21, 1927

INVENTOR
John A. McCarthy
BY
Samuel Stearnes
ATTORNEY

Reissued Oct. 21, 1930 Re. 17,836

UNITED STATES PATENT OFFICE

JOHN AUGUSTUS McCARTHY, OF ST. JOSEPH, MISSOURI, ASSIGNOR, BY MESNE ASSIGNMENTS, TO THE PATENT AND LICENSING CORPORATION, OF BOSTON, MASSACHUSETTS, A CORPORATION OF MASSACHUSETTS

SHINGLE

Original No. 1,670,469, dated May 22, 1928, Serial No. 234,705, filed November 21, 1927. Application for reissue filed December 19, 1929. Serial No. 415,317.

This invention relates to improvements in shingles of the flexible composition type and more particularly to improvements in shingles of this character, formed with locking means for holding down the free weather exposed portions thereof.

An object of the invention is to provide a shingle or shingle strip having locking means integrally formed in the shingle and designed to cooperate with portions of overlapping shingles for securely retaining the projecting free weather ends of the shingle against curling or being raised by wind pressure.

A further object of the invention resides in the provision of a shingle strip having integrally formed locking means so constructed as to be easy to manipulate when the shingles are being laid on a roof, and efficient in operation after they are laid, and interlocked one with another.

The invention will be best understood from a consideration of the following description, in view of the accompanying drawings forming a part of the specification. It is to be understood, however, that the invention is not confined to the disclosure, being susceptible of such changes and modifications as will define no material departure from the salient features of the invention, as set forth in the claims hereunto appended.

In the drawings—

Figure 1:
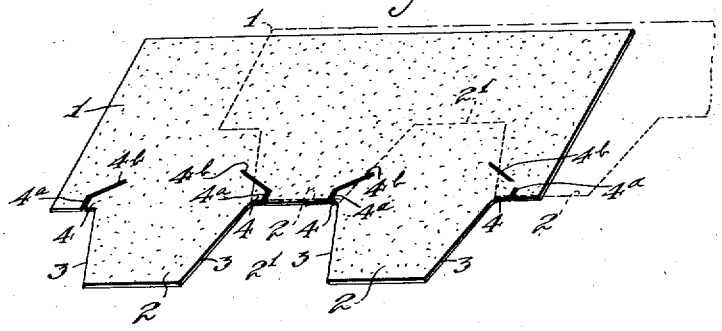
Fig. 1 is a view in perspective showing a strip shingle constructed according to the invention, together with its associated overlying shingle strip.
Figure 2:
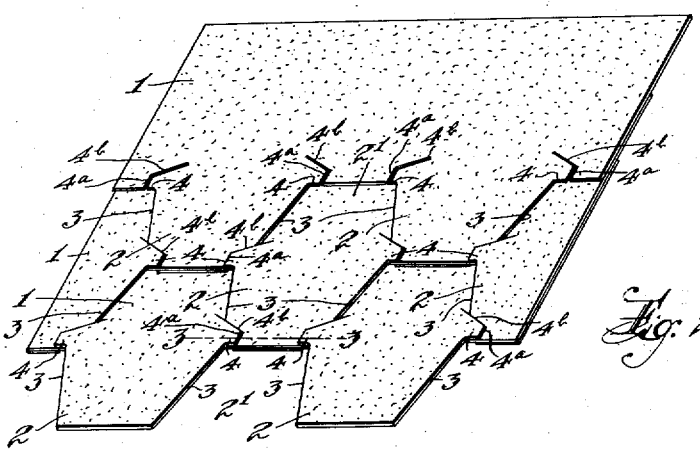
Fig. 2, is a perspective of a section of roof equipped with shingle strips embodying the invention.
Figure 3:
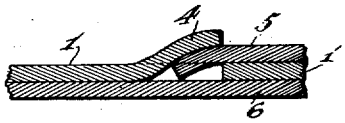
Fig. 3, is a section taken along line 3—3 of Fig. 2.

Referring more in detail to the drawing, the numeral 1 indicates the upper or main body portion of the shingle strip, and numeral 2 indicates the tabs projecting from the lower edge of the body portion. As shown on the drawing, the tabs are of semi-hexagonal shape having side-edges 3, and are spaced apart by complemental recesses 2; the shingle strips as thus constituted being cut from a sheet or roll of roofing material in a well known manner such that waste is eliminated.

Adjacent the upper side corners of each of the tabs, the body portion is formed with anchoring receptacles or ears 4 extending laterally beyond the upper side corners of each tab. These anchoring ears are formed by providing angular slits $4^a$, $4^b$ in the body portion adjacent the upper side corners of the tabs. The slits $4^a$ extend preferably at right angles to the lower weather edge of the body portion from points laterally of the upper extremities of the edges of the tabs. The slits $4^b$, at the opposite sides of each tab, extend in opposite upwardly inclined directions from the upper extremities of the slits $4^a$, to a point laterally inward of the upper extremities of the edges of the tab, and in the plane through which the side edge of a superposed tab passes.

The receptacles or anchoring ears as thus formed are adapted to overlie the lower side corners of the tabs of a superposed shingle strip when they are assembled in courses on a roof, to thus effectively retain the tabs in flatwise position and prevent the free ends thereof from curling or being raised by wind pressure.

The shingle strips constructed as aforesaid may be laid on a roof in the customary manner, it being necessary merely to insert the lower side corners of each tab beneath the respective anchoring ears 4. The construction shown and described provides an easily manipulable interlocking means which permits the lower side corners of the tabs to be properly inserted beneath the anchoring ears, by a downward movement, with substantially no loss of time by the workmen applying the shingles to the roof.

I claim as my invention:

1. A strip shingle having a body portion and a plurality of equally spaced tabs projecting from the weather side edge of the body, the body portion being formed at each side of each tab, with an angular slit forming anchoring ears in the body portion laterally adjacent each of the upper side corners of each tab and adapted to overlie and hold down the lower side corners of the tabs of a superposed strip when the strips are assembled in courses, said slits and the anchoring ears formed thereby being arranged to permit the lower side corners of the tabs of an overlying strip to be inserted beneath said anchoring ears by a downward movement of said overlying strip.

2. A strip shingle having a body portion and a plurality of equally spaced tabs projecting from the weather side edge of the body, the body portion having right and left angular slots forming angular receptacles between the tabs of a strip and the tabs of adjacent strips; the first leg of said angular slot being positioned at an angle to the weatherside edge of the body; and the second leg of which extends at an angle to the first leg from its inner end in a straight line direction toward the center between the tabs of a superimposed course of tabs, and terminating at a point in a plane of which the side edge of a superimposed tab passes through, when the strip shingle are assembled in courses.

3. A strip shingle having a body portion and a plurality of equally spaced tabs projecting from the weather side edge of the body, the body portion having right and left angular slots forming angular receptacles between the tabs of a strip and the tabs of adjacent strips; the first leg of said angular slot being positioned at a right angle to the weatherside edge of the body; and the second leg of which extends at an angle to the first leg from its inner end in a straight line direction toward the center between the tabs of a superimposed course of tabs, and terminating at a point in a plane of which the side edge of a superimposed tab passes through, when the strip shingles are assembled in courses.

JOHN AUGUSTUS McCARTHY.